United States Patent [19]

Weber et al.

[11] 4,310,447

[45] Jan. 12, 1982

[54] CURABLE AND CURED, MODIFIED AMINOTRIAZINE CONDENSATION PRODUCTS AND A MEANS AND PROCESS FOR THEIR MANUFACTURE

[75] Inventors: Wilhelm Weber, Frankfurt am Main; Wilhelm Adam, Neu Isenburg, both of Fed. Rep. of Germany

[73] Assignee: Cassella Aktiengesellschaft, Frankfurt, Fed. Rep. of Germany

[21] Appl. No.: 171,302

[22] Filed: Jul. 23, 1980

[30] Foreign Application Priority Data

Jul. 28, 1979 [DE] Fed. Rep. of Germany ....... 2930667

[51] Int. Cl.³ .............................................. C08L 61/28
[52] U.S. Cl. .......................... 260/29.4 R; 260/33.4 R; 260/39 R; 525/428; 525/519; 528/254
[58] Field of Search ................ 528/254, 258; 525/428, 525/519; 260/29.4 R, 33.4 R

[56] References Cited

U.S. PATENT DOCUMENTS 2,914,504 11/1959 Metzger et al. ...................... 525/519
4,171,294 10/1979 Dhein et al. ......................... 525/425

FOREIGN PATENT DOCUMENTS 1198710 7/1970 United Kingdom .

*Primary Examiner*—Theodore E. Pertilla
*Attorney, Agent, or Firm*—Connolly and Hutz

[57] ABSTRACT

Curable, modified aminotriazine condensation product prepared by reacting an aminotriazine condensation product pre-condensed to a dilutability ratio with water of 1:0.5 to 1:5, with 65 to 500% by weight, relative to the triazine, of a lactam of an aminocarboxylic acid having 3 to 18 carbon atoms, or a diaminedicarboxylate salt of a diamine having 2 to 18 carbon atoms and a dicarboxylic acid having 2 to 18 carbon atoms, or a mixture thereof, at a temperature of no more than 65° C.

12 Claims, No Drawings

CURABLE AND CURED, MODIFIED AMINOTRIAZINE CONDENSATION PRODUCTS AND A MEANS AND PROCESS FOR THEIR MANUFACTURE

It is known that melamine (1,3,5-triamino-s-triazine), acetoguanamine (2,4-diamino-6-methyl-s-triazine), benzoguanamine (2,4-diamino-6-phenyl-s-triazine) and other aminotriazines can be reacted with aldehydes, particularly with formaldehyde, in various molar ratios to give aminotriazine condensation products which are still soluble and still fusible. These products, also known as aminotriazine resins or methylolaminotriazine resins, can be cured to give insoluble and infusible products and have thus found numerous applications in industry, for example for the surface finishing of wood materials, for the manufacture of laminated sheets, compression moulding compositions and lacquer resins and for the manufacture of finishing agents in the textile and paper industry.

The processing of aminotriazine condensation products which are appropriately modified to suit different processing conditions and the desired product properties, such as elasticity, resistance to cracking and the like, is also known. The modification can be effected, for example, by etherification with monohydric or polyhydric alcohols, such as butanol, glycol, glycerol or pentaerythritol, by reaction with amines or aminocarboxylic acids, by reaction with sulphites or by the addition of polyalcohols, sugars, toluenesulphonamide, lactams and nitriles (compare, for example, Ullmanns Enzklopädie der techn. Chemie ("Ullmann's Encyclopaedia of Industrial Chemistry"), 4th Edition, Volume 7 (1973), page 409). Modified melamine impregnation resins for impregnating substrates composed of paper or fabrics for the production of compression-moulded laminates are obtained, for example (compare German Auslegeschrift No. 1,595,368), by subjecting melamine to a condensation reaction with formaldehyde in an aqueous medium in the presence of 3 to 15% by weight of $\epsilon$-aminocaprolactam, relative to the mixture of melamine and formaldehyde.

If the attempt is made to use pure methylolmelamines as casting resins, after curing, very brittle castings are obtained, which frequently split and develop cracks even during curing, so that aminotriazine resins have not been used as casting resins.

It has now been found, surprisingly, that curable, modified aminotriazine resins with novel possibilities for use are obtained if aminotriazine condensation products which have been pre-condensed to a water dilutability ratio of 1:0.5 to 1:5, preferably 1:1 to 1:2, are reacted with 65 to 500%, preferably 70 to 400%, relative to the weight of the triazine, of a salt of a diamine having 2 to 18 C atoms and of a dicarboxylic acid having 2 to 18 C atoms and/or a lactam of an aminocarboxylic acid having 3 to 18 C atoms.

The reaction according to the invention is effected in a simple manner by mixing the aminotriazine condensation product which has been pre-condensed to a water dilutability ratio of 1:0.5 to 1:5, preferably 1:1 to 1:2, in a suitable solvent, preferably in water or an organic solvent, such as, for example, ethanol, or a mixture of water and an organic solvent, for approx. 5 to 20 minutes at room temperature or at elevated temperatures, for example up to 65° C., with the salt of the diamine and of the dicarboxylic acid (described in the following text as diaminedicarboxylate) and/or the lactam. It is also possible to use a mixture of different, pre-condensed aminotriazine condensation products of optionally different aminotriazines and also a mixture of different diamine salts of dicarboxylic acids and/or a mixture of different lactams. The solutions thus prepared, which are preferably aqueous, preferably contain 55 to 70% by weight of the modified triazine resin according to the invention.

Suitable aminotriazine condensation products which have been pre-condensed to a water dilutability ratio of 1:0.5 to 1:5, preferably 1:1 to 1:2, are, above all, pre-condensed methylol compounds of aminotriazines, such as, for example, the methylol compounds which are obtained by methylolating acetoguanamine and/or benzoguanamine with 1 to 4 mols of formaldehyde and subjecting the product to a condensation reaction to the water dilutability ratio mentioned. However, it is preferable to use pre-condensed methylolmelamines which are obtained by methylolating melamine with 1 to 6 mols, especially with 1.5 to 3 mols, of formaldehyde and subjecting the product to a condensation reaction to the water dilutability ratio mentioned. In determining the water dilutability ratio, a sample of the resin is titrated at 20° C. with water until turbidity begins to form.

The following are examples of dicarboxylic acids which are suitable for the preparation of the diamine salts of dicarboxylic acids: oxalic acid, malonic acid, succinic acid, glutaric acid, adipic acid, pimelic acid, suberic acid, sebacic acid, maleic acid, fumaric acid, terephthalic acid, dodecanedicarboxylic acid, tetradecanedicarboxylic acid and hexadecanedicarboxylic acid, and the following diamines are examples of suitable diamines: ethylenediamine, trimethylenediamine, tetramethylenediamine, pentamethylenediamine, hexamethylenediamine, octamethylenediamine, decamethylenediamine, dodecamethylenediamine, tetradecamethylenediamine and hexadecamethylenediamine. However, within the scope of the present invention, diamines are also understood to mean diamines which have 4 to 18 C atoms and a carbon chain which is interrupted by one or more —NH— groups, such as, for example, diethylenetriamine, triethylenetetramine or tetraethylenepentamine.

Examples of suitable lactams are 2-pyrrolidone, 2-piperidone and $\epsilon$-caprolactam.

The salts formed from the diamines and the dicarboxylic acids are known and can be prepared by combining the components in water in a molar ratio of 1:1. The solution of the salt thus obtained can be used direct for the modification according to the invention. A typical representative of a salt of this type is the salt formed from adipic acid and hexamethylenediamine, known as AH salt.

The reaction of the pre-condensed aminotriazine condensation products with liquid lactams can also be effected entirely without a solvent.

The pH value of the resins modified in accordance with the invention is normally adjusted to 5 to 8. Acids used for the adjustment of the pH are, above all, organic acids, in particular hydroxy-acids, such as, for example, citric acid and glycollic acid.

The curable aminotriazine condensation products which have been modified in accordance with the invention are suitably prepared from dry mixtures, stable on storage, of a dried aminotriazine condensation product, preferably methylolmelamine, which has been pre-condensed to a water dilutability ratio of 1:0.5 to 1:5, preferably 1:1 to 1:2, and, relative to the triazine, 65 to 500%, preferably 70 to 400%, of a solid salt of a diamine having 2 to 18 C atoms and of a dicarboxylic acid having 2 to 18 C atoms; these ingredients merely need to be dissolved in a suitable solvent, preferably water.

The aminotriazine condensation products which have been modified in accordance with the invention are stable for some hours and then cure of their own accord. Curing can be accelerated by heating, for example heating at 60° to 100° C. for 20 to 200 minutes.

The properties of the aminotriazine condensation products which have been modified in accordance with the invention can be altered by varying the degree of methylolation of the aminotriazines or the quantity of modifying agent added, or by adjusting the pH value etc. The aminotriazine condensation products which have been modified in accordance with the invention are suitable, for example, for use in the following sectors: the manufacture of glues, water-based paints, castings, moulding compositions, brake linings, surface fillers, joint-sealing compositions, filter layers, diaphragm layers, carriers for liquids (for example fragrance distributors), additives for consolidating foundry sands, and the like. Reinforcement of mouldings by the incorporation of asbestos fibres, for example for brake linings, glass fibres and the like, is also possible.

If the aminotriazine condensation products which have been modified in accordance with the invention are used as casting resins, it is possible to produce glass-clear, opalescent to white-opaque castings having a dense to finely-porous structure. The white-opaque castings having a finely-porous structure are obtained, in particular, if AH salts are used as the modifying agent. The properties of the castings having a finely-porous structure are of great interest for a variety of end uses. After rinsing with water and subsequent drying, castings of this type have a density of 0.5 to 0.6 g/cm$^3$ and can re-absorb up to over 100% of their weight of a liquid.

The strength of the castings produced from the aminotriazine resins which have been modified in accordance with the invention depends on the quantity of the modifying agent, as shown in the following table:

| Melamine resin modified in accordance with the invention, prepared from a parts by weight of methylolmelamine and b parts by weight of AH salt | | Properties of the casting produced from the modified melamine resin | |
|---|---|---|---|
| a Parts by weight of methylolmelamine (2.6 mols of CH$_2$O/mol of melamine) | AH salt | | |
| | b Parts by weight | % by weight relative to melamine | Breaking load: at 8 cm kg | Deflection: distance between supports mm |
| 160 | 80 | 80.7 | 232 | 2.95 |
| 150 | 90 | 97 | 243 | 3.5 |
| 143 | 100 | 108 | 75 | 1.94 |
| 135 | 108 | 130 | 58 | 2.41 |

The figures related to a rod of diameter 26 mm.

Aminotriazine resins, in particular melamine resins, which have been modified in accordance with the invention using 150% by weight or more (relative to triazine) of lactams, can be cured to give castings which are translucent. After drying, the castings become clearer, giving slightly opalescent to glass-clear products which have high strength values.

In the examples which follow, the term parts by weight has been abbreviated to "pts. by wt." Unless otherwise indicated, percentages are percentages by weight. In Examples 2 to 18, unless otherwise specified, "methylolmelamine" denotes the methylolmelamine mentioned in Example 1 which contains 2.6 moles of formaldehyde per mole of melamine and has been pre-condensed to a water dilutability ratio of 1:1.5 and spray dried.

EXAMPLE 1

150 pts. by wt. of methylolmelamine (containing 2.6 mols of formaldehyde/mol of melamine and pre-condensed to a water dilutability ratio of approx. 1:1.5 and spray dried) and 90 pts. by wt. of AH salt (salt formed from hexamethylenediamine and adipic acid=97%, relative to melamine) are mixed, 196 pts. by wt. of water at 65° C. are poured over the mixture and the latter is stirred to approx. 5 minutes until solution takes place. A temperature of approx. 45° C. is set up in the course of mixing. After the air bubbles have risen to the top, a clear solution (approx. 55% strength) with a pH of 8.0 is obtained. The modified melamine resin thus prepared is cured by being heated to 90° C. on a water bath in the course of 1 to 1½ hours. The solution begins to become opalescent to 70° C. and at 72° C. it is opaque-white. The vessel containing the condensation product is now closed in order to prevent the surface drying out. Shortly after the maximum temperature (90° C.) has been reached, a very slight shrinking sets in, so that the solid casting becomes separated from the wall by a thin layer of liquid. This liquid layer makes possible problem-free release from the mould after the final condensation reaction (for example 45 minutes at 90° C.). The casting which has been removed from the mould is washed, and dried to constant weight at 50° C. It exhibits a microporous structure. The density of the dried material obtained is 0.55 g/cm$^3$. A rod of diameter 26 mm gives a flexural breaking strength of 243 kg at a distance of 8 cm between the supports.

If the casting is placed in water again, it absorbs 115% of its weight of water without being wet on the surface.

EXAMPLE 2

A modified resin, which had a pH value of 7.0, was prepared, as indicated in Example 1, from 160 pts. by wt. of methylolmelamine, 80 pts. by wt. of AH salts (=81%, relative to melamine) and 194 pts. by wt. of water at 65° C. It was cured to give a casting as in Example 1. Opalescence began to form at 65° C. and at 66° C. the mixture was cloudy and white. The duration of the condensation reaction was 1¼ hours at 90° C. The breaking load of a dried casting (a rod of 26.7 mm diameter) was 232 kg at a distance of 8 cm between the supports.

EXAMPLE 3

A modified resin, which had a pH value of 6.0, was prepared, as indicated in Example 1, from 160 pts. by wt. of methylolmelamine, 99 pts. by wt. of AH salt (=100%, relative to melamine) 208 pts. by wt. of water at 65° C. and 8 pts. by wt. of citric acid. It was cured as in Example 1. Opalescence began to form at 65° C. and at 68° C. the mixture was cloudy and white. The duration of the condensation reaction was 1¾ hours at 90° C. The breaking load of a dried casting (a rod of 26.3 mm diameter) was 190 kg at a distance of 8 cm between the supports.

EXAMPLE 4

A modified resin, the pH value of which was adjusted from 8 to 5.5 by adding 30 pts. by wt. of citric acid, was prepared, as indicated in Example 1, from 400 pt. by wt. of methylolmelamine, 175 pts. by wt. of AH salts (=71%, relative to melamine) and 500 pts. by wt. of water at 65° C. It was cured as in Example 1. Opalescence began at 46° C. The mixture was cloudy and white at 47° C. It separated from the wall at 83° C. The duration of the condensation reaction at 90° C. was ½ hour. The breaking load of a dried casting (a rod of 26.3 mm diameter) was over 250 kg at a distance of 8 cm between the supports.

EXAMPLE 5

A modified resin, which had a pH value of 8.0, was prepared, as indicated in Example 1, from 400 pts. by wt. of methylolmelamine (1.65 mols of formaldehyde/mol of melamine, pre-condensed to a water dilutability ratio of 1:1 and spray dried), 200 pts. by wt. of AH salt (=69.6%, relative to melamine) and 530 pts. by wt. of water at 65° C. It was cured as in Example 1. Opalescence began to form at 67° C. and at 68° C. the mixture was cloudy and white. At 90° C. the condensation reaction took ½ hour. The breaking load of a dried casting (a rod of 26.5 mm diameter) was over 250 kg at a distance of 8 cm between the supports.

EXAMPLE 6

A modified resin, the pH value of which was adjusted to 7.0 by adding 10 pts. by wt. of citric acid, was prepared, as indicated in Example 1, from 400 pts. by wt. of methylolmelamine (1.65 mols of formaldehyde/mol of melamine, pre-condensed to a water dilutability ratio of 1:1 and spray dried), 200 pts. by wt. of AH salt (=69.6%, relative to melamine) and 530 pts. by wt. of water at 65° C. It was cured as in Example 1. Opalescence began to form at 60° C. and at 61° C. the mixture was cloudy and white. At 90° C. the condensation reaction took 40 minutes. The breaking load of a casting (a rod of 26.0 mm diameter) was over 250 kg at a distance of 8 cm between the supports.

EXAMPLE 7

A modified resin, the pH value of which was adjusted from 7 to 8.0 by adding sodium hydroxide solution, was prepared, as indicated by Example 1, from 80 pts. by wt. of methylolmelamine, 49.4 pts. by wt. of AH salt (=100%, relative to melamine) and 104 pts. by wt. of water at 65° C. It was cured as in Example 1. The mixture was opalescent at 70° C. and cloudy and white at 72° C. At 87° to 90° C. the condensation reaction took 1 hour. The breaking load of a casting (a rod of 26.6 mm diameter) was over 250 kg at a distance of 8 cm between the supports.

EXAMPLE 8

(Comparison Example)

A resin solution of approx. 55% strength, having a pH of 7.0, was prepared, as indicated in Example 1, from 100 pts. by wt. of methylolmelamine, 25 pts. by wt. of AH salt (=40.5% relative to melamine) and 102 pts. by wt. of water at 65° C. Curing was carried out as in Example 1. Opalescence began at 54° C. and the mixture was cloudy and white at 60° C. The duration of the condensation reation was 1 hour. A stable casting was not obtained, instead, the casting broke up after cooling to room temperature.

EXAMPLE 9

80 pts. by wt. of methylolmelamine were dissolved in 80 pts. by wt. of water at 80° C., while stirring, and a mixture of 74 pts. by wt. of ε-caprolactam (=150%, relative to melamine) and 6 pts. by wt. of citric acid was then added to portions. A clear solution of a melamine resin modified in accordance with the invention was obtained. Curing was carried out as in Example 1. A solid gel was formed at 54° C. and this became opalescent as the temperature rose. At 90° C. the condensation reaction took 30 minutes. A transparent, nearly clear casting with the following properties was obtained: breaking load of a rod (22.6 mm diameter): 248 kg at a distance of 8 cm between the supports.

EXAMPLE 10

A solution of a resin modified in accordance with the invention was prepared, as indicated in Example 9, from 50 pts. by wt. of methylolmelamine, 50 pts. by wt. of water at 65° C., 62 pts. by wt. of ε-caprolactam (=200%, relative to melamine) and 5 pts. by wt. of adipic acid. The pH value of the solution was 5. Curing was carried out as in Example 1. A transparent, clear casting which had a breaking load of over 250 kg on a rod (21 mm diameter) at a distance of 8 cm between the supports, was obtained.

EXAMPLE 11

120 pts. by wt. of methylolmelamine and 44.4 pts. by wt. of AH salt (=60%, relative to melamine) were mixed in 130 pts. by wt. of water at 65° C. and a mixture of 22.2 pts. by weight. of ε-caprolactam (=30%, relative to melamine) and 5 pts. by wt. of adipic acid was added, while stirring. The clear solution of modified melamine resin had a pH value of 5 to 6. Curing was carried out as in Example 1. The mixture was opalescent at 63° C. and was cloudy and white (solid) at 65° C. Curing was completed for a further hour at 90° C. The breaking load of a rod (27.1 mm diameter) was 118 kg at a distance of 8 cm between the supports.

EXAMPLE 12

80 pts. by wt. of methylolmelamine were dissolved in 80 pts. by wt. of water at 65° C. 80 pts. by wt. of pyrrolidone (=162%, relative to melamine) at 35° C. were then added, while stirring. The clear solution of modified melamine resin had a pH value of 7, which was adjusted to 5 by adding 5.2 pts. by wt. of glycollic acid. Curing was carried out as in Example 1. The solution had gelled and was slightly opalescent at 56° C. The mixture was kept at 90° C. for 45 minutes.

After drying, the casting was clear and translucent. The breaking load of a rod (22.5 mm diameter) was over 250 kg at a distance of 8 cm between the supports.

EXAMPLE 13

30 pts. by wt. of methylolmelamine were dissolved in 30 pts. by wt. of water at 65° C. and 55.5 pts. by wt. of pyrrolidone (=300%, relative to melamine) at 35° C. were then mixed in. The pH value of the solution of the modified resin was 6 to 7 and was adjusted to 4.5 by adding 1.5 pts. by wt. of glycollic acid. Curing was carried out as in Example 1. The solution gelled and became slightly opalescent at 68° C. The opalescence became intensified at 73° C. The duration of the condensation reaction at 86° to 90° C. was 1 hour. After drying, the casting was clear and transparent. The breaking load of a rod (22 mm diameter) was 186 kg at a distance of 8 cm between the supports.

EXAMPLE 14

69 pts. by wt. of pyrrolidone (=380%, relative to melamine) were heated to 75° C. and 30 pts. by wt. of methylol melamine were introduced in portions, while stirring. The methylol-melamine dissolved in the pyrrolidone. The solution was cooled to 30° C. (slight preparation) and 4.5 pts. by wt. of 57% strength glycollic acid were stirred in, as a result of which the pH value was reduced to 5. The solution of modified resin was cured by heating in a water bath. At 76° C. the solution was once more completely clear, at 85° C. it was highly viscous and at 89° C. it was solid and slightly opalescent. The duration of the condensation reaction at 90° C. was 45 minutes. The breaking load of a rod (22 mm diameter) was 150 kg at a distance of 8 cm between the supports.

EXAMPLE 15

(A) 75 pts. by wt. of melamine, 119 pts. by wt. of formaldehyde (39% strength by weight, containing 1% of methanol), 33 pts. by wt. of water and 0.1 pts. by wt. of potassium carbonate;

(B) 70 pts. by wt. of ε-caprolactam (=93.3%, relative to melamine) and 10 pts. by wt. of citric acid.

The products listed under A were heated to 90° C., while stirring. A clear solution was formed and this was subjected to a condensation reaction at 90° C. until a sample had a dilutability ratio with water of only 1:1.5 at 20° C. After the mixture had been cooled to 30° C., the products mentioned under B were added in the form of a mixture, whereupon the pH value fell to 5. Curing was carried out as in Example 1. The solution became cloudy at 48° C. and it then became opaque and white. The duration of the condensation reaction at 90° C. was 45 minutes. The breaking load of a casting (a rod of 26.8 mm diameter, at a distance of 8 cm between the supports) was 198 kg.

EXAMPLE 16

42 pts. by wt. of sebacic acid were added in small portions, whilst stirring, to a mixture of 22 pts. by wt. of triethylenetetramine in 50 pts. by wt. of water. The pH value of the resulting solution A was 6.5.

Solution B, which had a pH value of 6, was prepared by stirring 69 pts. by wt. of methylolmelamine, 56 pts. by wt. of water and 0.3 pts. by wt. of citric acid. Solution B was then stirred into solution A. The pH value of the solution of modified melamine resin was 6.5. Curing was carried out as in Example 1. The solution gelled at 48° C. and it was white and cloudy at 54° C. The mixture was kept at 90° C. for a further 30 minutes. The breaking load of a rod (26 mm diameter) was 112 kg at a distance of 8 cm between the supports.

EXAMPLE 17

(A) 27 pts. by wt. of acetoguanamine, 33.3 pts. by wt. of formaldehyde (39% strength by weight, containing 1% of methanol) and 19.7 pts. by wt. of water;

(B) 30 pts. by wt. of pyrrolidone (=111%, relative to acetoguanamine);

(C) 2.6 pts. by wt. of 57% strength glycollic acid.

The products listed under A were mixed, the pH of the mixture was adjusted to 9 with sodium hydroxide solution and the mixture was adjusted to 9 with sodium hydroxide solution and the mixture was heated to 90° C., while stirring. This gave a clear solution, which was kept at 90° C. for a further 75 minutes. It was cooled to about 50° C. and B and C were added and the mixture was heated to 90° C. in the course of approx. 1 hour. The clear solution began to become opaque at 87° C. and it solidified at 89° C. to form a white mass which was kept at 90° C. for approx. 2 hours more. The breaking load of a casting (rod of 24 mm diameter and 8 cm distance between the supports) was 45 kg.

EXAMPLE 18

A solution of a modified resin, about 56% strength and having a pH value of 7.0, was prepared, as indicated in Example 1, from 80 pts. by wt. of methylolmelamine, 62 pts. by wt. of AH salt (=125%, relative to melamine) and 110 pts. by wt. of water at 65° C. The pH value was reduced to 6.0 by adding 13 pts. by wt. of 57% strength glycollic acid. This solution was stable for several hours, but its viscosity gradually rose. It was used for lacquering wood, small quantities of wetting agents, triglycol and methylcellulose also being added. The coating dried after about 24 hours and produced a glossy surface.

EXAMPLE 19

10 pts. by wt. of methylolmelamine and 7 pts. by wt. of AH salt were mixed and stirred into 14 pts. by wt. of water at 65° C., as described in Example 1. 1.3 pts. by wt. of glycollic acid were then mixed in. The further addition of 10 pts. by wt. of Celite (saturated with water) and 4.5 pts. by wt. of microcellulose and a little wetting agent gave a surface filler which could be ground 2 days after being applied.

Castings made in accordance with the present invention exhibit excellent machinability, including, for instance, boring and drilling, turning or sawing, and can be given any desired shape by using corresponding molds and possible finishing operations. This makes it possible to produce molded pieces of any kind for technical requirements and for use as consumer goods, such as buttons employed in the clothing industry, control or operating buttons and knobs, handles and switches, rings, clamps, axles, pointers, indicators and hands of clocks or watches, containers and housings and parts thereof, clasps, buckles and clips, cans, cases and casings, cover panels and cover plates, jackets and panelings, ornamental or decorative panels and articles, wheels, rolls and rollers, screws and bolts, tubes and rods of any crosssection, filter pads, merchandisers and displays, switch elements, etc. Porous molded pieces of the invention which can be impregnated with highly different liquids such as perfumes, odorants, scented or fragrant substances, lubricants etc. and can therefore be employed, for instance, as fragrance distributors or bearings and supports, offer particularly interesting possibilities of application. The fact that the products of the invention can be produced using only a low proportion of petroleum-based starting substances constitutes another advantage.

We claim:

1. Curable, modified aminotriazine condensation product prepared by reacting in water or an organic solvent an aminotriazine condensation product pre-condensed to a dilutability ratio with water of 1:0.5 to 1:5, with 65 to 500% by weight, relative to the triazine, of a lactam of an aminocarboxylic acid having 3 to 18 carbon atoms, or a diaminedicarboxylate salt of a diamine having 2 to 18 carbon atoms and a dicarboxylic acid having 2 to 18 carbon atoms, or a mixture thereof, at a temperature of no more than 65° C.

2. Curable, modified aminotriazine condensation product according to claim 1 wherein the reaction is carried out in an aqueous solvent.

3. Curable, modified aminotriazine condensation product according to claim 1 wherein the precondensed aminotriazine condensation product has a dilutability ratio with water of 1:1 to 1:2.

4. Curable, modified aminotriazine condensation product according to claim 1 wherein the precondensed aminotriazine condensation product is a methylolmelamine which has 1 to 6 methylol groups.

5. Curable, modified aminotriazine condensation product according to claim 1 wherein the amount of lactam, diaminedicarboxylate, or mixture thereof is 70 to 400% by weight, relative to the triazine.

6. Curable, modified aminotriazine condensation product according to claim 1 wherein the diaminedicarboxylate is a salt formed from adipic acid and hexamethylenediamine.

7. Curable, modified aminotriazine condensation product according to claim 1 wherein the lactam is ε-caprolactam.

8. Curable, modified aminotriazine condensation product according to claim 1 wherein the lactam is 2-pyrrolidone.

9. Process for the manufacture of the curable, modified aminotriazine condensation product of claim 1 comprising reacting at a temperature of no more than 65°,
(a) an aminotriazine condensation product precondensed to a dilutability ratio with water of 1:0.5 to 1:5 with
(b) 65 to 500% by weight, relative to the triazine, of a salt of a diamine having 2 to 18 carbon atoms and a dicarboxylic acid having 2 to 18 carbon atoms, or a lactam of an aminocarboxylic acid having 3 to 18 carbon atoms, or a mixture thereof.

10. Process for the manufacture of the aminotriazine condensation product according to claim 1 comprising dry mixing
(a) a dried aminotriazine condensation product which has been pre-condensed to a dilutability ratio with water of 1:0.5 to 1:5 and
(b) 65 to 500%, relative to the triazine, of a solid salt of a diamine having 2 to 18 carbon atoms and a dicarboxylic acid having 2 to 18 carbon atoms.

11. In the process for the manufacture of a cured, modified aminotriazine condensation product, the improvement comprises exposing the aminotriazine condensation product according to claim 1 to a temperature from 60° to 100° C. for 20 to 200 minutes.

12. The cured modified aminotriazine condensation product according to claim 11.

* * * * *